(12) United States Patent
Takada

(10) Patent No.: US 12,443,031 B2
(45) Date of Patent: Oct. 14, 2025

(54) OPTICAL PATH CONTROL APPARATUS AND DISPLAY APPARATUS

(71) Applicant: JVCKENWOOD Corporation, Yokohama (JP)

(72) Inventor: Hiroyuki Takada, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 493 days.

(21) Appl. No.: 17/939,055

(22) Filed: Sep. 7, 2022

(65) Prior Publication Data

US 2023/0089186 A1 Mar. 23, 2023

(30) Foreign Application Priority Data

Sep. 21, 2021 (JP) .................................. 2021-153172
Sep. 21, 2021 (JP) .................................. 2021-153468
Sep. 21, 2021 (JP) .................................. 2021-153469

(51) Int. Cl.
    *G02B 26/08* (2006.01)
    *G02B 26/10* (2006.01)
    *H04N 9/31* (2006.01)

(52) U.S. Cl.
    CPC ......... *G02B 26/101* (2013.01); *H04N 9/3152* (2013.01)

(58) Field of Classification Search
    CPC ............. G02B 26/101; G02B 26/0816; H04N 9/3152; H04N 9/3105; H04N 9/317; H04N 9/3188
    See application file for complete search history.

(56) References Cited

U.S. PATENT DOCUMENTS

| | | | | |
|---|---|---|---|---|
| 7,256,926 B2 * | 8/2007 | Kamiya | ............. | G02B 26/0833 359/872 |
| 7,442,918 B2 * | 10/2008 | Sprague | ............... | G02B 26/085 359/872 |
| 2008/0042052 A1 | 2/2008 | Sprague et al. | | |
| 2016/0091773 A1 | 3/2016 | Mizoguchi et al. | | |
| 2019/0227261 A1 | 7/2019 | Smith | | |

(Continued)

FOREIGN PATENT DOCUMENTS

| | | |
|---|---|---|
| JP | 2002-258205 | 9/2002 |
| JP | 2003-270555 | 9/2003 |

(Continued)

*Primary Examiner* — Euncha P Cherry
(74) *Attorney, Agent, or Firm* — Amin, Turocy & Watson, LLP

(57) ABSTRACT

An optical path control apparatus includes an oscillating part. The oscillating part has an optical part on which light is made incident, a first oscillating part for supporting the optical part, and a second oscillating part for supporting the first oscillating part in an oscillatable manner by a first shaft part and being supported on a support part in an oscillatable manner by a second shaft part. The optical path control apparatus includes a first actuator configured to oscillate the oscillating part about a first oscillation axis including the first shaft part as a support; and a second actuator configured to oscillate the oscillating part about a second oscillation axis including the second shaft part as a support. The first oscillation axis crosses the second oscillation axis. The torsional rigidity of the second shaft part is higher than the torsional rigidity of the first shaft part.

5 Claims, 12 Drawing Sheets

(56) References Cited

U.S. PATENT DOCUMENTS

| | | |
|---|---|---|
| 2020/0145627 A1 | 5/2020 | Hosaka et al. |
| 2020/0174357 A1 | 6/2020 | Chen et al. |
| 2020/0174359 A1 | 6/2020 | Chen et al. |
| 2020/0225329 A1 | 7/2020 | Wang et al. |

FOREIGN PATENT DOCUMENTS

| | | |
|---|---|---|
| JP | 2016-071232 | 5/2016 |
| JP | 2020-013047 | 1/2020 |
| JP | 2020-077911 | 5/2020 |
| JP | 2021-056351 | 4/2021 |

* cited by examiner

OPTICAL PATH CONTROL APPARATUS AND DISPLAY APPARATUS

CROSS-REFERENCE TO RELATED APPLICATIONS

This application claims priority from Japanese Application Nos. 2021-153172, 2021-153468, and 2021-153469, each filed on Sep. 21, 2022, the entire contents of all of which are incorporated herein by reference.

BACKGROUND

The present invention relates to an optical path control apparatus and a display apparatus.

There are known optical devices shifting an optical axis by oscillating an optical part on which light is made incident. Japanese Patent Application Laid-open No. 2016-071232 and Japanese Patent Application Laid-open No. 2020-077911, for example, describe a technique that can make the resolution of a projected image higher than the resolution of an optical modulation apparatus by oscillating the optical part to shift the optical path of light passing through the optical part.

There are known optical devices shifting the optical path of the light passing through the optical part by oscillating the optical part about each of a first axis and a second axis crossing each other. In such optical devices, there is a problem in that an image may be displayed during the oscillation of the optical part, and if the oscillation time of the optical part by the first axis and the oscillation time of the optical part by the second axis are different from each other, the image output during the oscillation of the optical part by the first axis and the image output during the oscillation of the optical part by the second axis are different from each other in appearance, thus degrading image quality.

In view of the above problem, an object of the present invention is to provide an optical path control apparatus and a display apparatus making an image output during the oscillation of the optical part by first shaft parts and an image output during the oscillation of the optical part by second shaft parts uniform in appearance to suppress degradation of image quality.

SUMMARY

An optical path control apparatus according to an embodiment includes: an oscillating part, the oscillating part having an optical part on which light is made incident, a first oscillating part for supporting the optical part, and a second oscillating part for supporting the first oscillating part in an oscillatable manner by a first shaft part, the second oscillating part being supported on a support part in an oscillatable manner by a second shaft part; a first actuator configured to oscillate the oscillating part about a first oscillation axis including the first shaft part with the first shaft part as a support; and a second actuator configured to oscillate the oscillating part about a second oscillation axis including the second shaft part with the second shaft part as a support. The first oscillation axis crosses the second oscillation axis. Torsional rigidity of the second shaft part is higher than torsional rigidity of the first shaft part.

An optical path control apparatus according to an embodiment includes: an oscillating part having an optical part on which light is made incident; an actuator configured to oscillate the oscillating part; a drive unit configured to apply a drive signal with a waveform including a first period in which a current value is changed and a second period in which the current value is held, to the actuator to oscillate the oscillating part and to control an optical path of light passing through the optical part; a vibration sensor configured to detect a frequency of the oscillating part; and a parameter setting unit configured to set the drive signal with the waveform based on the frequency of the oscillating part detected by the vibration sensor.

A display apparatus according to an embodiment includes: the above-described optical path control apparatus; and an irradiation apparatus configured to irradiate the optical part with light.

DETAILED DESCRIPTION

The following describes embodiments of the present invention in detail based on the accompanying drawings. The embodiments described below do not limit the present invention.

First Embodiment

Schematic Configuration of Display Apparatus

Figure 1:
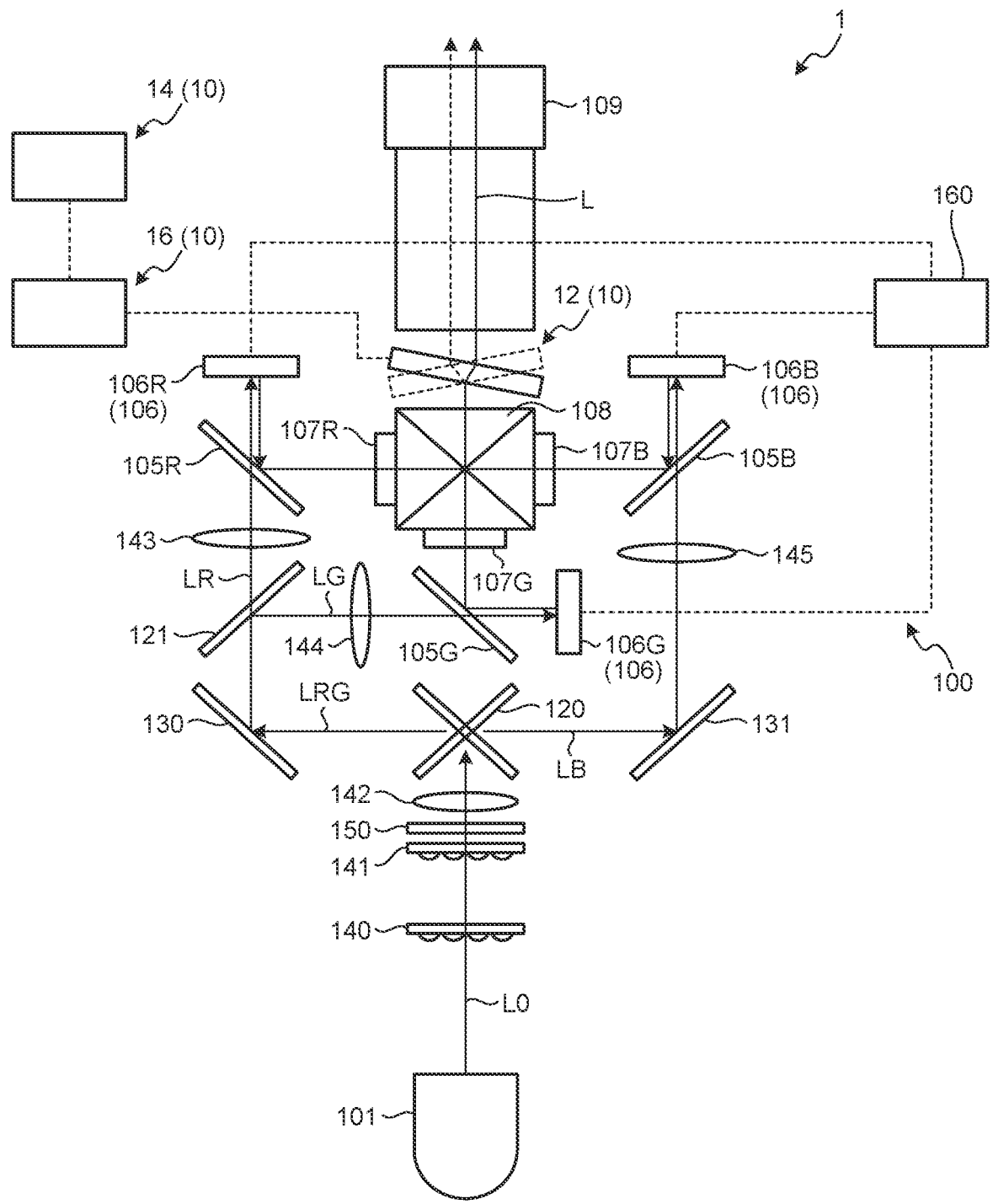
FIG. 1 is a schematic diagram of a display apparatus according to a first embodiment.

FIG. 1 is a schematic diagram of a display apparatus according to a first embodiment.

In the first embodiment, as illustrated in FIG. 1, the display apparatus 1 has an optical path control apparatus 10 and an irradiation apparatus 100. The irradiation apparatus 100 is an apparatus emitting light L for images. The optical path control apparatus 10 is an apparatus controlling an optical path of the light L. The optical path control apparatus 10 shifts the optical axis of the light L to shift the position of an image displayed by the light L and to make the resolution of a projected image higher than the resolution of an image by the irradiation apparatus 100 (that is, the number of pixels of a display element 106 described below).

The irradiation apparatus 100 includes a light source 101, polarizing plates 105R, 105G, and 105B, display elements 106R, 106G, and 106B, polarizing plates 107R, 107G, and 107B, a color combining prism 108, a projection lens 109, dichroic mirrors 120 and 121, reflective mirrors 130 and 131, lenses 140, 141, 142, 143, 144, and 145, a polarization conversion element 150, and an image signal processing circuit 160. When the display element 106R, the display element 106G, and the display element 106B are not distinguished from each other, they are referred to as the display element 106.

The light source 101 is a light source generating and emitting light. The light source 101 emits incident light L0. The following description takes using one light source 101 as the light source emitting the incident light L0 as an example; another optical apparatus for generating the incident light L0 may be included.

The incident light L0 from the light source 101 is made incident on the lens 140. The lens 140 and the lens 141 are, for example, fly-eye lenses. The incident light L0 is made uniform in illumination distribution by the lenses 140 and 141 and is made incident on the polarization conversion element 150. The polarization conversion element 150 is an element aligning the polarization of the incident light L0 and has, for example, a polarization beam splitter and a retardation plate. For example, the polarization conversion element 150 aligns the incident light L0 to the p-polarized light.

The incident light L0, the polarization of which has been aligned by the polarization conversion element 150, is applied to the dichroic mirror 120 through the lens 142. The lens 142 is, for example, a condenser lens.

The dichroic mirror 120 separates the incident light L0 made incident thereon into yellow light LRG and blue light LB, which contains blue band components. The yellow illumination light LRG separated by the dichroic mirror 120 reflects off the reflective mirror 130 and is made incident on the dichroic mirror 121.

The dichroic mirror 121 separates the yellow light LRG made incident thereon into red light LR, which contains red band components, and green light LG, which contains green band components.

The red light LR separated by the dichroic mirror 121 is applied to the polarizing plate 105R through the lens 143. The green light LG separated by the dichroic mirror 121 is applied to the polarizing plate 105G through the lens 144. The blue light LB separated by the dichroic mirror 120 reflects off the reflective mirror 131 and is applied to the polarizing plate 105B through the lens 145.

The polarizing plates 105R, 105G, and 105B have the property of reflecting either the s-polarized light or the p-polarized light and passing the other. For example, the polarizing plates 105R, 105G, and 105B reflect the s-polarized light and pass the p-polarized light. The polarizing plates 105R, 105G, and 105B are also referred to as reflective polarizing plates.

The red light LR, which is the p-polarized light, passes through the polarizing plate 105R and is applied to the display element 106R. The green light LG, which is the p-polarized light, passes through the polarizing plate 105G and is applied to the display element 106G. The blue light LB, which is the p-polarized light, passes through the polarizing plate 105B and is applied to the display element 106B.

The display element 106R, the display element 106G, and the display element 106B are, for example, reflective liquid crystal display elements. The following description describes a case in which the display element 106R, the display element 106G, and the display element 106B are reflective liquid crystal display elements as an example; not limited to the reflective type, transmissive liquid crystal display elements may also be used. They can also be applied in various ways to configurations including other display elements in place of the liquid crystal display elements.

The display element 106R is controlled by the image signal processing circuit 160. The image signal processing circuit 160 drives and controls the display element 106R based on red component image data. The display element 106R optically modulates the red light LR as the p-polarized light in accordance with the control of the image signal processing circuit 160 to generate the red light LR as the s-polarized light. The display element 106G is controlled by the image signal processing circuit 160. The image signal processing circuit 160 drives and controls the display element 106G based on green component image data. The display element 106G optically modulates the green light LG as the p-polarized light in accordance with the control of the image signal processing circuit 160 to generate the green light LG as the s-polarized light. The display element 106B is controlled by the image signal processing circuit 160. The image signal processing circuit 160 drives and controls the display element 106B based on blue component image data. The display element 106B optically modulates the blue light LB as the p-polarized light based on the blue component image data in accordance with the control of the image signal processing circuit 160 to generate the blue light LB as the s-polarized light.

The polarizing plates 107R, 107G, and 107B have the property of passing either the s-polarized light or the p-polarized light and reflecting or absorbing the other. For example, the polarizing plates 107R, 107G, and 107B pass the s-polarized light and absorb the p-polarized light, which is unnecessary.

The red light LR as the s-polarized light generated by the display element 106R is reflected by the polarizing plate 105R, passes through the polarizing plate 107R, and is applied to the color combining prism 108. The green light LG as the s-polarized light generated by the display element 106G is reflected by the polarizing plate 105G, passes through the polarizing plate 107G, and is applied to the color combining prism 108. The blue light LB as the s-polarized light generated by the display element 106B is reflected by the polarizing plate 105B, passes through the polarizing plate 107B, and is applied to the color combining prism 108.

The color combining prism 108 combines the red light LR, the green light LG, and the blue light LB made incident and applies them as the light L for image display to the projection lens 109. The light L is projected onto a screen or the like, not illustrated, through the projection lens 109.

Although the irradiation apparatus 100 is configured as described above, its configuration is not limited to the above description; any configuration may be employed.

The optical path control apparatus 10 has an optical path control mechanism 12, a control circuit (a controller) 14, and a drive circuit (a drive unit) 16. The optical path control mechanism 12 is a mechanism oscillating by being driven by the drive circuit 16. The optical path control mechanism 12 is provided between the color combining prism 108 and the projection lens 109 in a direction along the optical path of the light L. The optical path control mechanism 12 oscillates while the light L from the color combining prism 108 is made incident thereon, thereby shifting the travel direction (the optical path) of the light L and emitting it toward the projection lens 109. Thus, the optical path control apparatus 10 controls the optical path of the light L so as to shift the optical path of the light L. The position in which the optical path control mechanism 12 is provided is not limited to between the color combining prism 108 and the projection lens 109 but may be any position.

Functional Configuration of Display Apparatus

Figure 2:
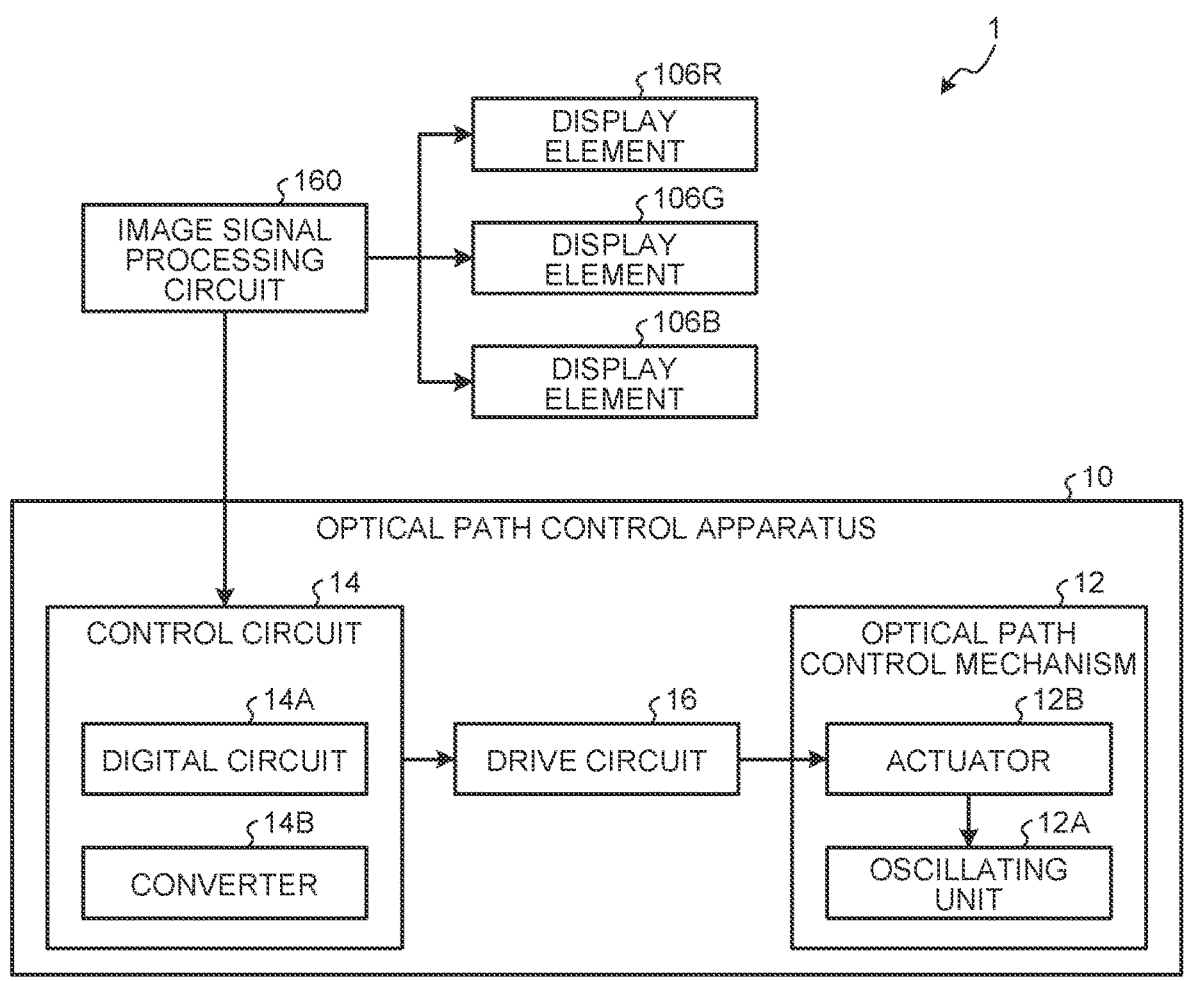
FIG. 2 is a block diagram schematically illustrating a circuit configuration of the display apparatus.

FIG. 2 is a block diagram schematically illustrating a circuit configuration of the display apparatus.

As illustrated in FIG. 2, the image signal processing circuit 160 controls the display elements 106R, 106B, and 106G. An image signal including image data for controlling the display elements 106R, 106B, and 106G and a synchronization signal is input to the image signal processing circuit 160. The image signal processing circuit 160 controls the display elements 106R, 106B, and 106G based on the image data while synchronizing timing based on the synchronization signal. A control circuit 14 has a digital circuit 14A and a converter 14B. The synchronization signal from the image signal processing circuit 160 is input to the digital circuit 14A. The digital circuit 14A generates a digital drive signal to drive the optical path control mechanism 12 while synchronizing timing based on the synchronization signal. The converter 14B is a digital-to-analog (DA) converter converting a digital signal to an analog signal. The converter 14B converts the digital drive signal generated by the digital circuit 14A into an analog drive signal. The drive circuit 16 receives input of the analog drive signal from the converter 14B, amplifies the analog drive signal, and outputs it to actuators 12B of the optical path control mechanism 12 described below. The actuators 12B are driven in response to the drive signal to oscillate an oscillating part 12A described below (refer to FIG. 3).

Optical Path Control Mechanism

Figure 3:
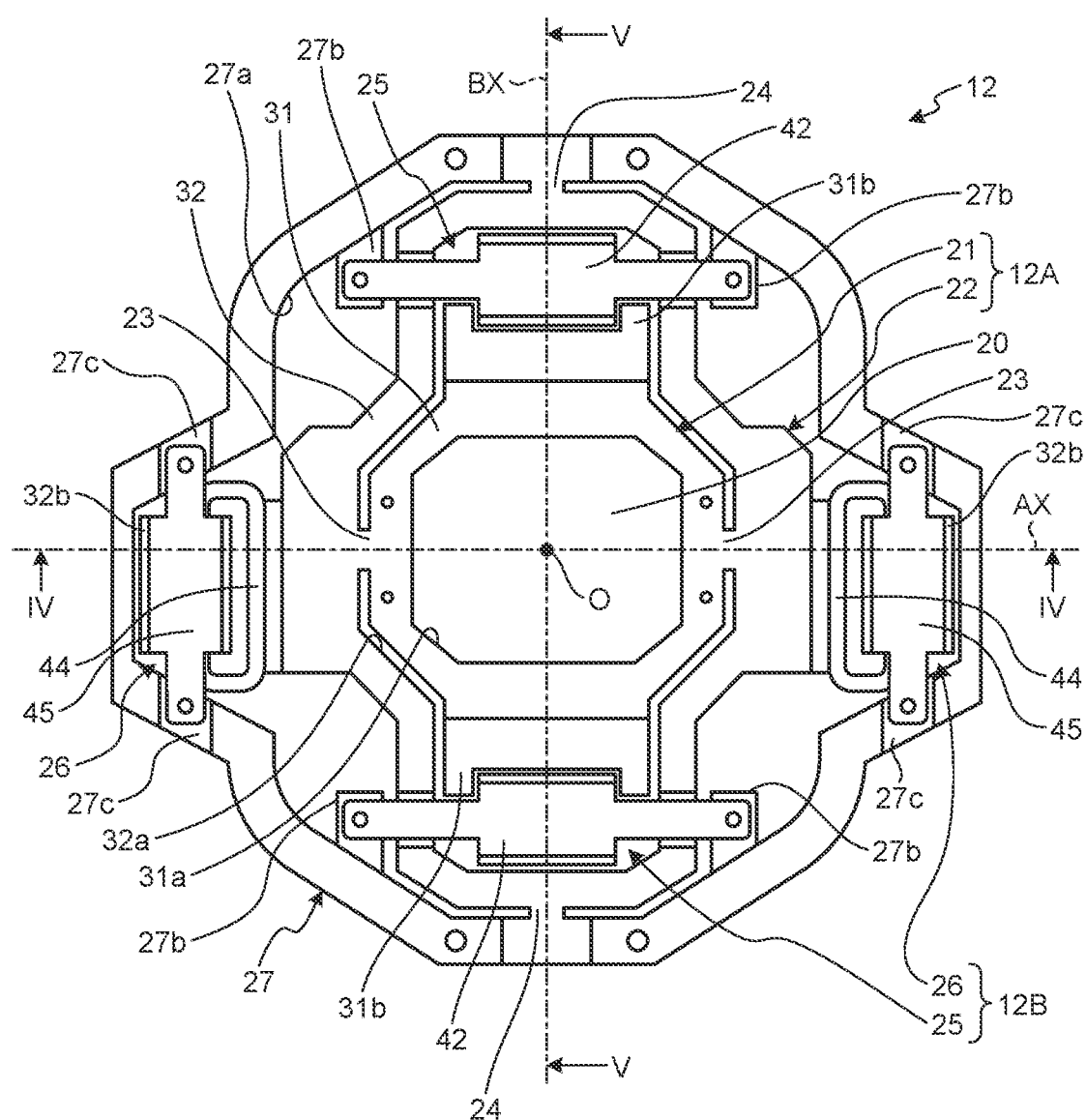
FIG. 3 is a plan view of an optical path control mechanism.
Figure 4:
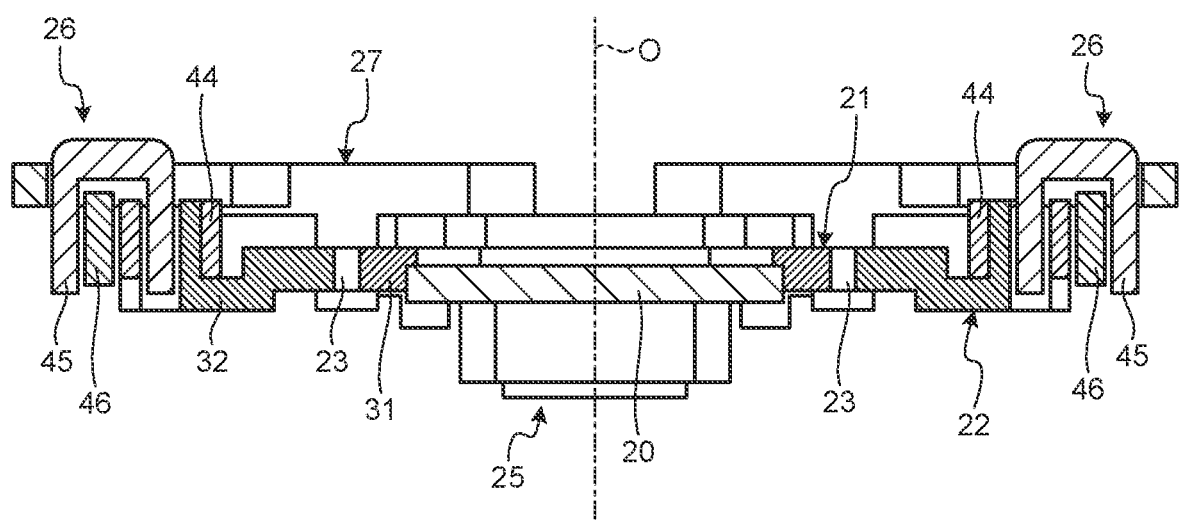
FIG. 4 is a IV-IV sectional view of FIG. 3.
Figure 5:
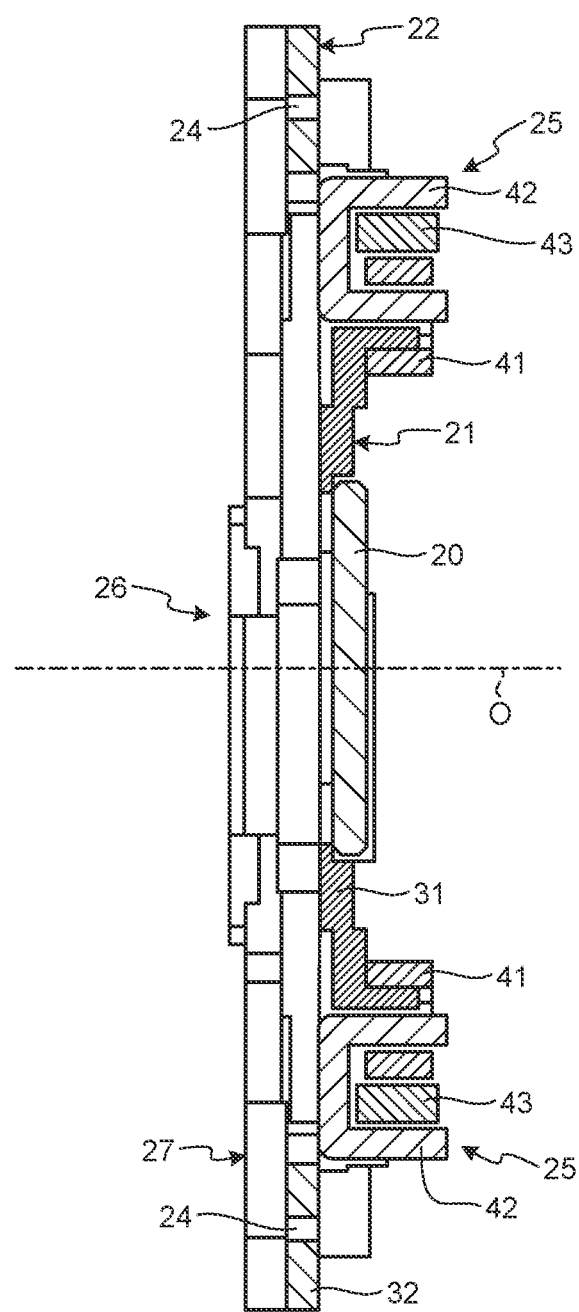
FIG. 5 is a V-V sectional view of FIG. 3.

FIG. 3 is a plan view of the optical path control mechanism, FIG. 4 is a IV-IV sectional view of FIG. 3, and FIG. 5 is a V-V sectional view of FIG. 3.

As illustrated in FIG. 3 to FIG. 5, the optical path control mechanism 12 has the oscillating part 12A including an optical member 20 (an optical part) on which the light L is made incident and the actuators 12B oscillating the oscillating part 12A.

The actuators 12B oscillate the oscillating part 12A about a first oscillation axis AX and a second oscillation axis BX along two directions crossing (preferably orthogonal to) the direction in which the light L is made incident on the optical member 20. The first oscillation axis AX and the second oscillation axis BX are preferably orthogonal to each other. Thus, the optical path control mechanism 12 has a first oscillating part 21 and a second oscillating part 22 as the oscillating part 12A, first shaft parts 23 and second shaft parts 24 along the first oscillation axis AX and the second oscillation axis BX, respectively, first actuators 25 and second actuators 26 as the actuators 12B, and a support part 27.

The optical member 20 is a member passing the light L made incident thereon. The optical member 20 makes the light L incident on one surface, passes the light L made incident thereon, and emits the light L from the other surface. The optical member 20 is a glass plate; any material and shape may be employed.

The first oscillating part 21 has the optical member 20 and a first movable part 31. The first movable part 31 is a member supporting the optical member 20. The first movable part 31 is fixed to the optical member 20. Specifically, the first movable part 31 is a plate frame-shaped member formed with a through hole 31a at the center. The optical member 20 is fixed to the first movable part 31 fit into the through hole 31a of the first movable part 31. The optical member 20 is fixed to the first movable part 31 via a fixing member or adhesive to be fixed to the first movable part 31; any method for fixing the optical member 20 to the first movable part 31 may be employed.

The second oscillating part 22 is placed outside the first oscillating part 21. The second oscillating part 22 has a second movable part 32. The second movable part 32 is a member supporting the first movable part 31. The first movable part 31 is supported in an oscillatable manner about the first oscillation axis AX with respect to the second movable part 32. Specifically, the second movable part 32 is a plate frame-shaped member formed with a through hole 32a at the center. The first movable part 31 is supported on the second movable part 32 in an oscillatable manner placed spaced apart from the through hole 32a of the second movable part 32 by a certain gap. The first movable part 31 and the second movable part 32 are coupled to each other by a pair of first shaft parts 23 along the first oscillation axis AX. The first movable part 31 oscillates about the first oscillation axis AX by the pair of first shaft parts 23 becoming elastically deformed so as to be twisted with respect to the second movable part 32.

The support part 27 is placed outside the second oscillating part 22. The support part 27 is a member supporting the second movable part 32. The second movable part 32 is supported in an oscillatable manner about the second oscillation axis BX with respect to the support part 27. Specifically, the support part 27 is a plate frame-shaped member formed with a through hole 27a at the center. The second movable part 32 is supported on the support part 27 in an oscillatable manner placed spaced apart from the through hole 27a of the support part 27 by a certain gap. The second movable part 32 and the support part 27 are coupled to each other by a pair of second shaft parts 24 along the second oscillation axis BX. The second movable part 32 oscillates about the second oscillation axis BX by the pair of second shaft parts 24 becoming elastically deformed so as to be twisted with respect to the support part 27.

The second movable part 32 (the second oscillating part 22) oscillates about the second oscillation axis BX with respect to the support part 27 with the pair of second shaft parts 24 as supports. The first movable part 31 (the first oscillating part 21) oscillates about the first oscillation axis AX with respect to the second movable part 32 with the pair of first shaft parts 23 as supports. Thus, the optical member 20 fixed to the second movable part 32 can oscillate about the first oscillation axis AX and the second oscillation axis BX. The optical member 20 oscillates about the first oscillation axis AX and the second oscillation axis BX, whereby the optical path of the light L passing through the optical member 20 can be shifted by a change in the attitude of the optical member 20.

In the first embodiment, the first movable part 31, the second movable part 32, the first shaft parts 23, and the second shaft parts 24 are integrally formed. Thus, the first movable part 31 oscillates with respect to the second movable part 32 by the first shaft parts 23 becoming elastically deformed so as to be twisted in a circumferential direction. However, the first movable part 31, the second movable part 32, and the first shaft parts 23 may be separately formed and coupled to each other. One end and the other end of the second movable part 32 in the axial direction of the second oscillation axis BX are coupled to the support part 27 to be fixed, and the second shaft parts 24 are formed at the respective ends of the second movable part 32. However, the second shaft parts 24 may be provided at the respective ends of the second movable part 32, and the second shaft parts 24 may be directly coupled to the support part 27 to be fixed.

Furthermore, the second movable part 32, the second shaft parts 24, and the support part 27 may be integrally formed.

The first actuators 25 oscillate the first movable part 31 (the first oscillating part 21) about the first oscillation axis AX with respect to the support part 27 with the pair of first shaft parts 23 as supports. The first actuators 25 are placed both on one side and the other side in a radial direction (the axial direction in the second oscillation axis BX) from the first oscillation axis AX. The first actuators 25 each have a coil 41, a yoke 42, and a magnet 43.

The coil 41 is mounted on the first movable part 31 and is fixed to a coil mounting part 31b provided in the first movable part 31. The coils 41 are provided at the respective ends of the first movable part 31 in the radial direction of the first oscillation axis AX (one side and the other side of the second oscillation axis BX in the axial direction). The yokes 42 are members forming a magnetic path. The yokes 42 are mounted on the support part 27 and are fixed to the support part 27. The yokes 42 are provided at the respective ends of the first movable part 31 in correspondence with the coils 41. The magnets 43 are permanent magnets. The magnets 43 are mounted on the respective yokes 42 and are fixed to the respective yokes 42. The magnets 43 are placed at positions adjacent to the respective coils 41.

The drive signal from the drive circuit 16 (refer to FIG. 2) is input to the coils 41. In the example illustrated in FIG. 5, the magnet 43 is bonded to one side of the U-shaped yoke 42, forming an air gap between the face of the magnet 43 that is not bonded and the U-shaped opposing face of the yoke 42. The coil 41 is placed within the air gap. When the drive signal is input to the coils 41, a current flows through the coils 41, which are conductors within the air gaps (magnetic fields) caused by the magnets 43 and the yokes 42 to generate a force in the coils 41, and this force causes the first movable part 31 (the first oscillating part 21) fixed to the coils 41 to oscillate. That is to say, it can be said that the first actuator 25 is an electromagnetic actuator including the coil 41, the yoke 42, and the magnet 43.

The second actuators 26 oscillate the second movable part 32 (the second oscillating part 22) about the second oscillation axis BX with respect to the support part 27 with the pair of second shaft parts 24 as supports. The second actuators 26 are placed both on one side and the other side in a radial direction (the axial direction in the first oscillation axis AX) from the second oscillation axis BX. The second actuators 26 each have a coil 44, a yoke 45, and a magnet 46.

The coil 44 is mounted on the second movable part 32 and is fixed to a coil mounting part 32b provided in the second movable part 32. The coils 44 are provided at the respective ends of the second movable part 32 in the radial direction of the second oscillation axis BX (one side and the other side of the first oscillation axis AX in the axial direction). The yokes 45 are members forming a magnetic path. The yokes 45 are mounted on the support part 27 and are fixed to the support part 27. The yokes 45 are provided at the respective ends of the second movable part 32 in correspondence with the coils 44. The magnets 46 are permanent magnets. The magnets 46 are mounted on the respective yokes 45 and are fixed to the respective yokes 45. The magnets 46 are placed at positions adjacent to the respective coils 44.

The drive signal from the drive circuit 16 (refer to FIG. 2) is input to the coils 44. In the example illustrated in FIG. 4, the magnet 46 is bonded to one side of the U-shaped yoke 45, forming an air gap between the face of the magnet 46 that is not bonded and the U-shaped opposing face of the yoke 45. The coil 44 is placed within the air gap. When the drive signal is input to the coils 44, a current flows through the coils 44, which are conductors within the air gaps (magnetic fields) caused by the magnets 46 and the yokes 45 to generate a force in the coils 44, and this force causes the second movable part 32 (the second oscillating part 22) fixed to the coils 44 to oscillate. That is to say, it can be said that the second actuator 26 is an electromagnetic actuator including the coil 44, the yoke 45, and the magnet 46.

In the optical path control mechanism 12, the first movable part 31 provided with the optical member 20 oscillates, and in addition, the second movable part 32 on which the first movable part 31 is supported oscillates, and thus it can be said that the optical member 20, the first movable part 31, the second movable part 32, and the coils 41 and 44 form the oscillating part 12A. That is to say, it can be said that the part of the optical path control mechanism 12 oscillating with respect to the support part 27 refers to the oscillating part 12A. The first shaft parts 23 also oscillate together with the second movable part 32 and are thus included in the oscillating part 12A. When fixing members or adhesive for fixing the optical member 20 to the first movable part 31 or a substrate or lead wires for passing a current through the coils 41 and 44 are provided, they also oscillate with respect to the support part 27 and are thus also included in the oscillating part 12A.

In the first embodiment, the first actuators 25 oscillate the first movable part 31, whereas the second actuators 26 oscillate the second movable part 32. In this case, the yokes 42 and 45 forming the actuators 25 and 26, respectively, are fixed to the support part 27. Thus, when the second actuators 26 oscillate the second movable part 32, in order for the first actuators 25 and the second movable part 32 not to interfere with each other, a gap is ensured between them. The first actuators 25 may be provided in the second movable part 32.

Although the actuators 25 and 26 are of what is called a moving coil type, in which the coils 41 and 44 are placed in the movable parts 31 and 32, respectively, this is not limiting; for example, they may be what is called a moving magnet type, in which the magnets 43 and 46 are placed in the movable parts 31 and 32, respectively, whereas the coils 41 and 44 are placed in the support part 27. In this case, the magnets 43 and 46 are oscillated together with the optical member 20, and thus the magnets 43 and 46 are included in the oscillating part 12A in place of the coils 41 and 44.

Although the optical path control mechanism 12 is configured as described above, this is not limiting; any configuration in which the optical part oscillates by the actuators to which the drive signal has been applied to enable the shift of the optical path of the light L by the optical part may be employed.

First Shaft Parts and Second Shaft Parts

Figure 6:
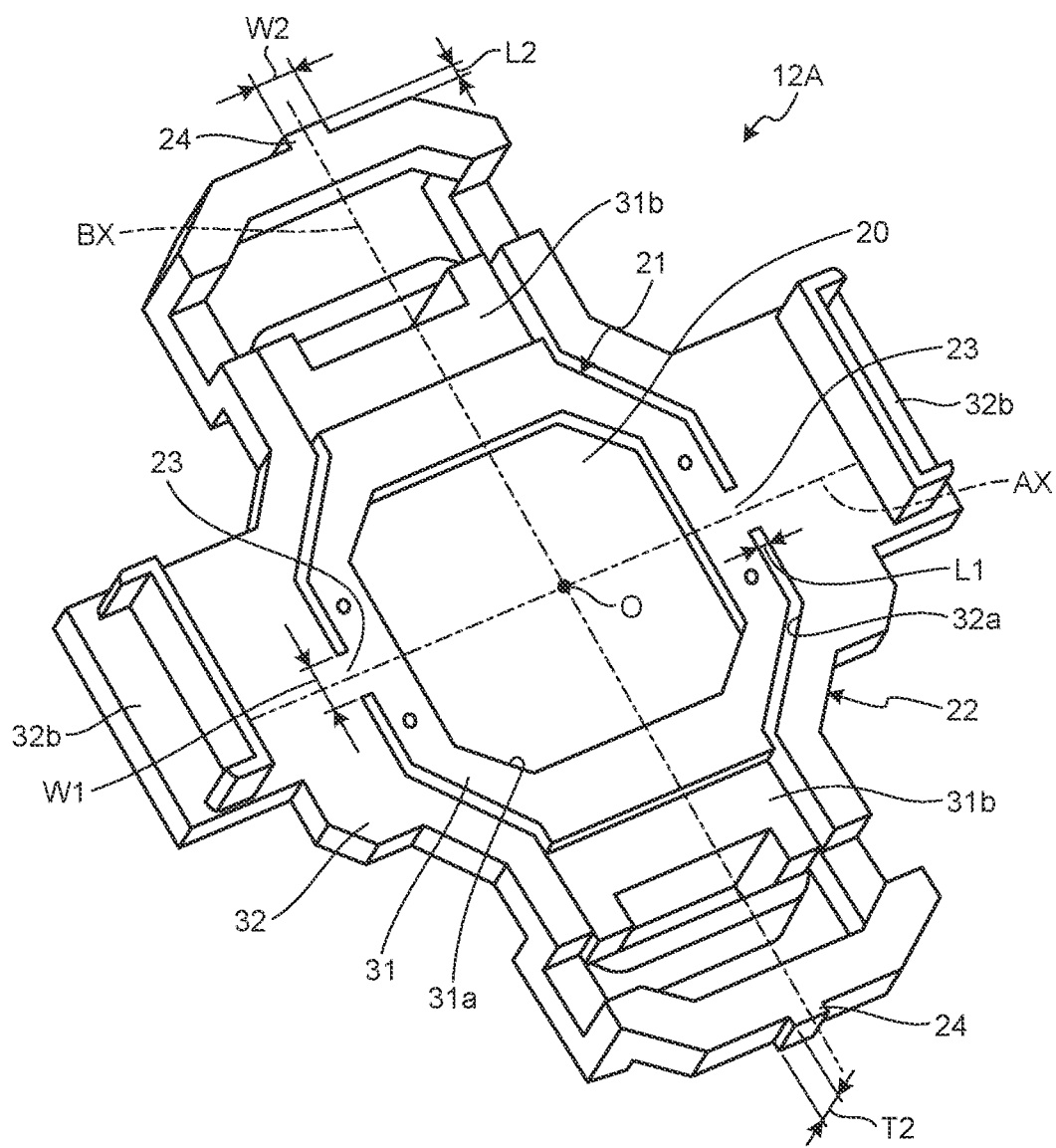
FIG. 6 is a perspective view of an oscillating part of the optical path control mechanism.

FIG. 6 is a perspective view of the oscillating part of the optical path control mechanism.

As illustrated in FIG. 6, the first movable part 31 forming the first oscillating part 21 and the second movable part 32 forming the second oscillating part 22 are coupled to each other by the first shaft parts 23 along the first oscillation axis AX, whereas the second movable part 32 and the support part 27 are coupled to each other by the second shaft parts 24 along the second oscillation axis BX. Here, the mass of the first oscillating part 21 and the distance from the first oscillation axis AX to the outer peripheral part of the first movable part 31 and the mass of the second oscillating part 22 and the distance from the second oscillation axis BX to the outer peripheral part of the second movable part 32 are different from each other. Thus, the moment of inertia when the first actuators 25 oscillate the first movable part 31 with the first shaft parts 23 as supports and the moment of inertia when the second actuators 26 oscillate the second movable part 32 with the second shaft parts 24 as supports are different from each other.

That is to say, the moment of inertia $I_1$ of the first movable part 31 when the first actuators 25 oscillate the first movable part 31 about the first oscillation axis AX with the first shaft parts 23 as supports can be considered as follows. Considering the first movable part 31 as a collection of a particle with a mass m1 and the distance of the particle from the first oscillation axis AX (the radius of rotation of the particle) as r1, the moment of inertia of the rotating particle is expressed by the following formula.

$$I_1 = m1 \cdot r1^2$$

The first movable part 31 is considered to be a collection of the particle, and thus the moment of inertia I of the first movable part 31 about the first oscillation axis AX is expressed as the sum of the product of the mass m1 of an infinitesimal part, which is the particle of the first movable part 31, and the square of the distance from the first oscillation axis AX (the radius of rotation r1).

Similarly, the moment of inertia 12 of the second movable part 32 when the second actuators 26 oscillate the second movable part 32 about the second oscillation axis BX with the second shaft parts 24 as supports is expressed as the sum of the product of a mass m2 of an infinitesimal part, which is the particle of the second movable part 32, and the square of the distance from the second oscillation axis BX (the radius of rotation r2). Thus, the moment of inertia when the first movable part 31 is oscillated about the first oscillation axis AX and the moment of inertia when the second movable part 32 is oscillated about the second oscillation axis BX are different from each other.

Then, the natural frequency when the first movable part 31 oscillates and the natural frequency when the second movable part 32 oscillates are different from each other, making the displacement times of the two parts different from each other. In the display apparatus 1, an image may be displayed during the oscillation of the optical member 20, and if the displacement time of the first movable part 31 and the displacement time of the second movable part 32 are different from each other, the images output during the oscillation of the respective parts are different from each other in appearance, thus degrading image quality.

In the first embodiment, the torsional rigidity of the second shaft parts 24 is set to be higher than the torsional rigidity of the first shaft parts 23. The first shaft parts 23 and the second shaft parts 24 are made different from each other in at least one of a cross-sectional area, a length, and a material to make the torsional rigidity of the second shaft parts 24 higher than the torsional rigidity of the first shaft parts 23.

The natural frequency of the first movable part 31 and the second movable part 32 is determined by the moment of inertia about the axes and the torsional rigidity of the shafts. The moment of inertia about the axes is determined by the mass of the first oscillating part 21 and the mass of the second oscillating part 22 and the distance from the first oscillation axis AX to the first movable part 31 and the distance from the second oscillation axis BX to the second movable part 32. The torsional rigidity of the shafts is determined by the cross-sectional area, the length, and the material of the first shaft parts 23 and the second shaft parts 24. The distance from the second oscillation axis BX to the second movable part 32 is longer than the distance from the first oscillation axis AX to the first movable part 31, and thus the second movable part 32 has a larger moment of inertia and a lower natural frequency than those of the first movable part 31. Thus, by making the torsional rigidity of the second shaft parts 24 higher than the torsional rigidity of the first shaft parts 23, the second movable part 32 is reduced in the moment of inertia and is increased in the natural frequency. Then, the natural frequency of the first movable part 31 and the natural frequency of the second movable part 32 are approximated to each other or, preferably, equal to each other.

When the natural frequency of the first movable part 31 and the natural frequency of the second movable part 32 are the same, the displacement time of the first movable part 31 and the displacement time of the second movable part 32 are the same, thus making the images output during the oscillation of the respective parts the same in appearance and suppressing degradation of image quality.

In the first embodiment, the first shaft parts 23 and the second shaft parts 24 are made of the same material. The first shaft parts 23 and the second shaft parts 24 have the same radial lengths L1 and L2. The first shaft parts 23 and the second shaft parts 24 have different cross-sectional areas. The cross-sectional area of the first shaft parts 23 is a width W1×a thickness T1, whereas the cross-sectional area of the second shaft parts 24 is a width W2×a thickness T2. The height of the torsional rigidity is proportional to the cross-sectional area, and thus the cross-sectional area of the first shaft parts 23 (the width W1×the thickness T1)<the cross-sectional area of the second shaft parts 24 (the width W2×the thickness T2) is set. The height of the torsional rigidity is inversely proportional to the axial length, and thus the length L1 of the first shaft parts 23>the length L2 of the second shaft parts 24 may be set. The first shaft parts 23 and the second shaft parts 24 are made different from each other in at least one of the cross-sectional area, the length, and the material to make the torsional rigidity of the second shaft parts 24 higher than the torsional rigidity of the first shaft parts 23. For example, when the thicknesses T1 and T2 of the first shaft parts 23 and the second shaft parts 24 are the same and the axial lengths L1 and L2 of the first shaft parts 23 and the second shaft parts 24 are the same, by making the width W2 of the second shaft parts 24 larger than the width W1 of the first shaft parts 23, difference can be made so as to give the torsional rigidity of the second shaft parts>the torsional rigidity of the first shaft parts.

Drive Signal

Figure 7:
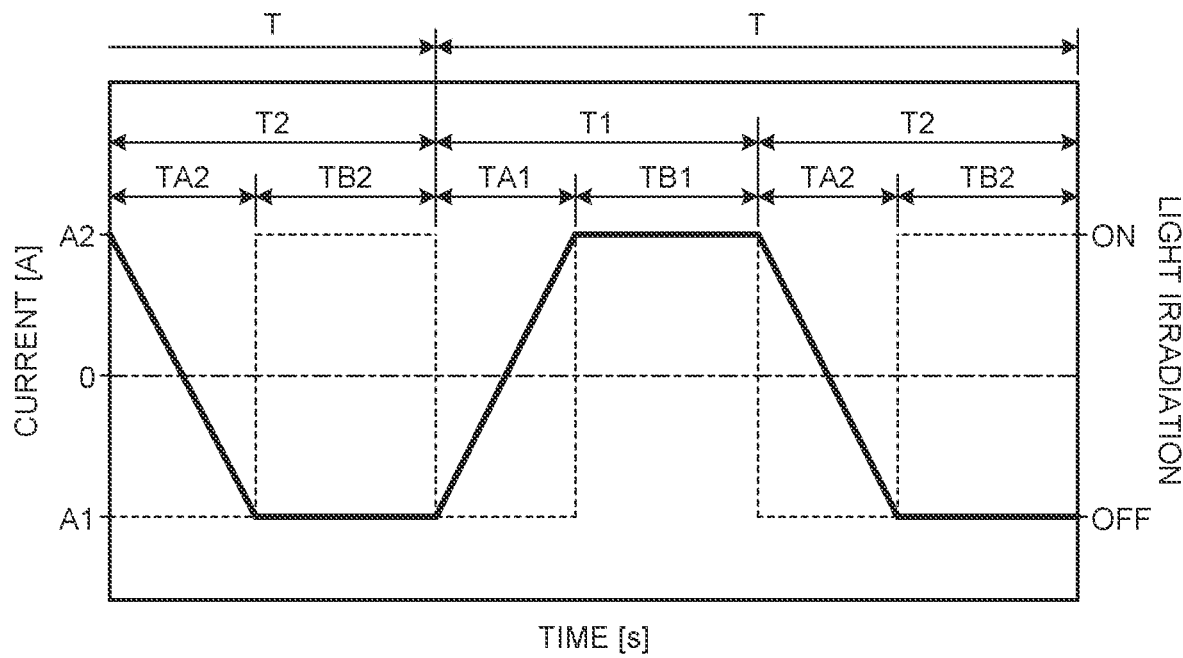
FIG. 7 is a graph illustrating a waveform of a drive signal of a drive unit.

The following describes the drive signal applied from the drive circuit 16 to the actuators 12B. FIG. 7 is a graph illustrating a waveform of a drive signal of the drive unit.

As illustrated in FIG. 7, the drive signal applied from the drive circuit 16 to the first actuators 25 is an electric signal, and the current value changes with the passage of time. In the following, the waveform representing a change in the current value with time of the drive signal is referred to as the waveform of the drive signal. The waveform of the drive signal is illustrated by a solid line in FIG. 7. The drive signal has the same waveform repeated every cycle T. The cycle T includes a period T1 and a period T2, which is after the period T1 and is continuous with the period T1. The period T1 corresponds to a period in which an image when the optical axis of the light L is in a first position (an image not shifted by half a pixel) is displayed, whereas the period T2 corresponds to a period in which an image when the optical axis of the light L is in a second position (an image shifted by half a pixel) is displayed.

In a first period TA1 of the period T1, the drive signal changes the current value from a first current value A1 to a second current value A2. Here, the middle position 0 between the first current value A1 and the second current value A2 is a position at which the current value is 0. In the first period TA1, the drive signal changes the current value linearly from the first current value A1 to the second current value A2 with the passage of time. That is to say, the drive signal has a current value of the first current value A1 at the start timing of the first period TA1, then changes the current value linearly from the first current value A1, and has a current value of the second current value A2 at the end timing of the first period TA1. The first current value A1 is a current value that can hold the first oscillating part 21 at a first angle D1 and is set in accordance with the value of the first angle D1. The second current value A2 is a current value that can hold the first oscillating part 21 at a second angle D2 and is set in accordance with the value of the second angle D2. The first current value A1 and the second current value A2 are current values opposite to each other in polarity, and their absolute values may be equal. FIG. 7 exemplifies that the first current value A1 is negative, whereas the second current value A2 is positive.

The length of the first period TA1 is a value corresponding to the natural frequency of the first oscillating part 21. The first oscillating part 21 refers to the part of the optical path control mechanism 12 oscillating with respect to the support part 27 (the optical member 20, the first movable part 31, and the coils 41 in the first embodiment). That is to say, the length of the first period TA1 can be said to be a value corresponding to the natural frequency of the part oscillating with respect to the support part 27. More specifically, the length of the first period TA1 is preferably substantially the same value as the natural period of the first oscillating part 21 and more preferably the same value as the natural period. The natural period is the inverse of the natural frequency. The term "substantially the same value" means that values that deviate from the natural period by about an error range are also acceptable. For example, when the deviation with respect to the natural period is within 5% of the value of the natural period, it may also be "substantially the same value." In the following, too, the description "substantially the same value" refers to the same meaning. The value of the natural period (the inverse of the natural frequency) is expressed as "1/f" [s] when the natural frequency is f [Hz].

The drive signal holds the current value at the second current value A2 in a second period TB1 of the period T1. The second period TB1 is a period that is after the first period TA1 and is continuous with the first period TA1. Increasing the natural frequency of the first oscillating part 21 is desirable, because doing so can shorten the first period TA1 and lengthen the second period TB1 (can lengthen it than the first period TA1, for example). Holding at the second current value A2 is not limited to the current value not changing strictly from the second current value A2 but may also include the current value shifting from the second current value A2 within the range of a certain value. The certain value here may be set to any value and may be a value 10% of the second current value A2, for example.

Thus, in the period T1, the drive signal gradually changes the current value from the first current value A1 to the second current value A2 and, when the current value reaches the second current value A2, holds the current value at the second current value A2.

In a third period TA2 of the period T2, the drive signal changes the current value from the second current value A2 to the first current value A1. The third period TA2 can be said to be a period that is after the second period TB1 and is continuous with the second period TB1. More specifically, in the third period TA2, the drive signal changes the current value linearly from the second current value A2 to the first current value A1 with the passage of time. That is to say, the drive signal has a current value of the second current value A2 at the start timing of the third period TA2, then changes the current value linearly from the second current value A2, and has a current value of the first current value A1 at the end timing of the third period TA2.

The length of the third period TA2 is the value corresponding to the natural frequency of the first oscillating part 21. More specifically, the length of the third period TA2 is preferably substantially the same value as the natural period (the inverse of the natural frequency) of the first oscillating part 21 and more preferably the same value as the natural period. In the third period TA2, the length of the third period TA2 is equal to the length of the first period TA1.

In a fourth period TB2 of the period T2, the drive signal holds the current value at the first current value A1. The fourth period TB2 is a period that is after the third period TA2 and is continuous with the third period TA2. The fourth period TB2 is a period that is before the first period TA1 and is continuous with the first period TA1. The fourth period TB2 is equal to the second period TB1. Increasing the natural frequency of the first oscillating part 21 is desirable, because doing so can shorten the third period TA2 and lengthen the fourth period TB2 (can lengthen it than the third period TA2, for example). Holding at the first current value A1 is not limited to the current value not changing strictly from the first current value A1 but may also include the current value shifting from the first current value A1 within the range of a certain value. The certain value here may be set to any value and may be a value 10% of the first current value A1, for example.

Thus, in the period T2, the drive signal gradually changes the current value from the second current value A2 to the first current value A1 and, when the current value reaches the first current value A1, holds the current value at the first current value A1.

As described above, in the first embodiment, the waveform of the drive signal is trapezoidal, and the first period TA1 and the third period TA2, in which the current value changes, are the value corresponding to the natural frequency of the oscillating part 12A.

The broken line illustrated in FIG. 7 illustrates periods during which the light L is applied. It is preferable that the irradiation apparatus 100 do not apply the light L in the first period TA1 and apply the light L in the second period TB1. It is preferable that the irradiation apparatus 100 do not apply the light L in the third period TA2 and apply the light L in the fourth period TB2.

Oscillation Pattern

Figure 8:
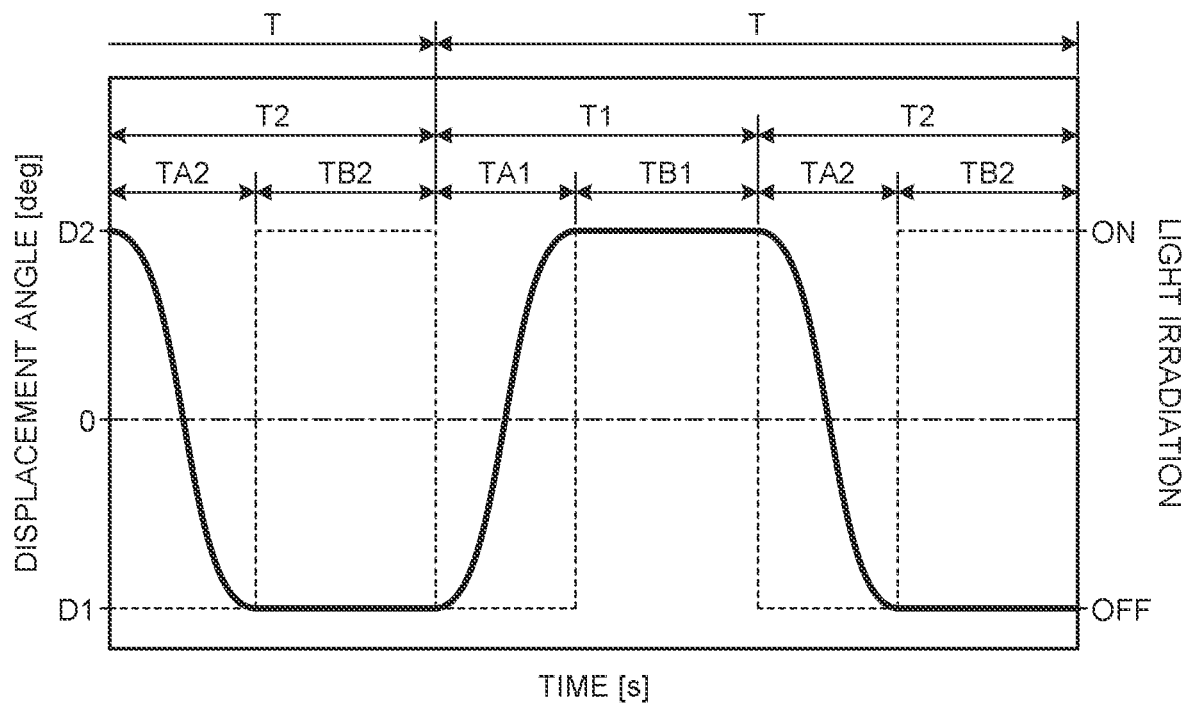
FIG. 8 is a graph illustrating a one-axis oscillation pattern of an optical part.

The following describes an oscillation pattern of the first oscillating part 21 by the application of the drive signal. FIG. 8 is a graph illustrating a one-axis oscillation pattern of the optical part.

As illustrated in FIG. 8, the oscillation pattern of the first oscillating part 21 refers to the displacement angle (an angle about the first oscillation axis AX) of the first oscillating part 21 with time when the drive signal is applied to the first actuators 25. In FIG. 8, the oscillation pattern is illustrated by a solid line.

In the first period TA1, the drive signal changes the current value from the first current value A1 to the second current value A2. Thus, the first oscillating part 21 changes the displacement angle from the first angle D1 to the second angle D2 in the first period TA1. Here, the middle position 0 between the first current value D1 and the second current value D2 is a position at which the displacement angle of the first oscillating part 21 is zero.

In the second period TB1, the drive signal holds the current value at the second current value A2. Thus, the first oscillating part 21 holds the displacement angle at the second angle D2 in the second period TB1. Holding at the second angle D2 is not limited to the displacement angle not changing strictly from the second angle D2 but may also include the displacement angle shifting from the second angle D2 within the range of a certain value. The certain value here may be set to any value and may be a value 10% of the second angle D2, for example.

In the third period TA2, the drive signal changes the current value from the second current value A2 to the first current value A1. Thus, the first oscillating part 21 changes the displacement angle from the second angle D2 to the first angle D1 in the third period TA2.

In the fourth period TB2, the drive signal holds the current value at the first current value A1. Thus, the first oscillating part 21 holds the displacement angle at the first angle D1 in the fourth period TB2. Holding at the first angle D1 is not limited to the displacement angle not changing strictly from the first angle D1 but may also include the displacement angle shifting from the first angle D1 within the range of a certain value. The certain value here may be set to any value and may be a value 10% of the first angle D1, for example.

The light L is applied in the second period TB1 and the fourth period TB2. Thus, in the second period TB1, the light L is applied to the first oscillating part 21 held at the second angle D2, making the optical path of the light L the first position. In the fourth period TB2, the light L is applied to the first oscillating part 21 held at the first angle D1, shifting the optical path of the light L to the second position, and shifting the image by half a pixel.

In the optical path control apparatus 10 shifting the optical path by oscillating the optical member 20, the optical member 20 is required to be stably oscillated. In the first embodiment, by setting the lengths of the first period TA1 and the third period TA2 to the value corresponding to the natural frequency of the first oscillating part 21, the first oscillating part 21 is suppressed from vibrating in the second period TB1 and the fourth period TB2, and the first oscillating part 21 can be oscillated stably. That is to say, the lengths of the first period TA1 and the third period TA2 are the value corresponding to the natural frequency of the first oscillating part 21, and thus the vibration of the first oscillating part 21 in the second period TB1 and the fourth period TB2 is suppressed, and the first oscillating part 21 can be oscillated stably. Thus, the first oscillating part 21 is oscillated at high speed and is stopped stably, and image degradation can be suppressed.

The drive signal applied to the first actuators 25 has been described as the drive signal applied from the drive circuit 16 to the actuators 12B. The drive signal applied to the second actuators 26 is the same, and a description thereof is omitted.

Pixel Operation by Optical Path Control Mechanism

Figure 9:
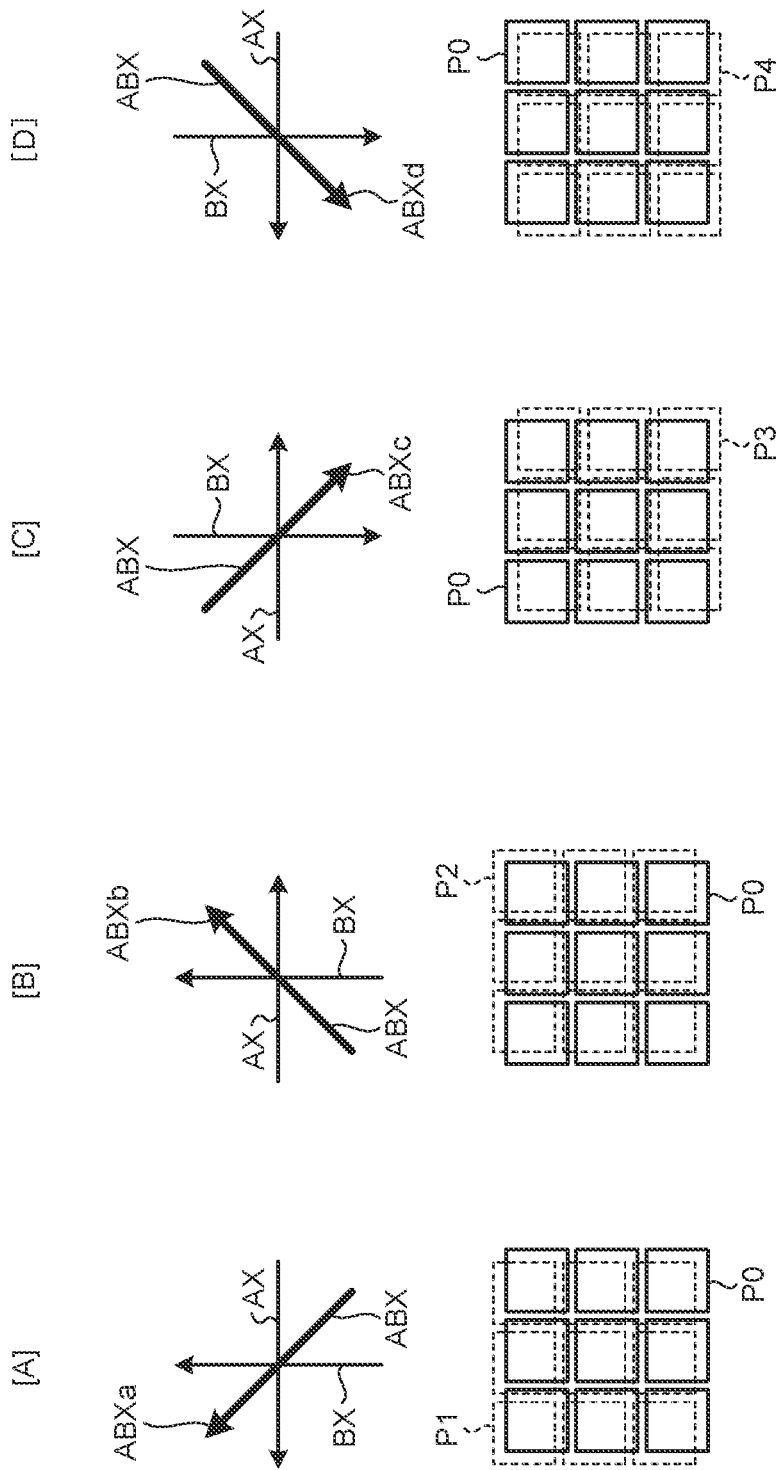
FIG. 9 is an illustrative diagram illustrating a two-axis oscillation pattern of the optical part.

The following describes an action when the first oscillating part 21 and the second oscillating part 22 are oscillated. FIG. 9 is an illustrative diagram illustrating a two-axis oscillation pattern of the optical part.

In the optical path control mechanism 12 of the first embodiment, the first actuators 25 and the second actuators 26 forming the actuators 12B oscillate the first oscillating part 21 and the second oscillating part 22, respectively, so as to repeat an attitude change from the first angle D1 to the second angle D2 and an attitude change from the second angle D2 to the first angle D1 about the first oscillation axis AX and the second oscillation axis BX each in accordance with the drive signal. The first oscillating part 21 and the second oscillating part 22 each repeat the oscillation between the first angle D1 and the second angle D2, whereby the optical axis of the light L repeats a shift from the first position to the second position and a shift from the second position to the first position.

That is to say, an image projected onto the screen by the light L when the optical axis is in the first position and an image projected onto the screen by the light L when the optical axis is in the second position are shifted by half a pixel. That is to say, the image projected on the screen repeats shifts by half a pixel and returns by half a pixel. This increases an apparent number of pixels and enables images projected onto the screen to have a higher resolution. The optical axis shift amount is equivalent to half a pixel of the image, and thus the first angle D1 and the second angle D2 are set to angles that can shift the image by half a pixel. The image shift amount is not limited to being equivalent to half a pixel but may be any amount such as ¼ or ⅛ of a pixel, for example. The first angle D1 and the second angles D2 may be set as appropriate in line with the image shift amount.

The following gives a specific description. Here, the first oscillation axis AX direction and the second oscillation axis BX direction cross each other in an orthogonal direction and are parallel to a pixel arrangement direction. As illustrated in FIG. 3 and FIG. 9, the image position P0 is a display position when the current value applied to the first actuators 25 and the second actuators 26 is zero, that is, when the displacement angle of the optical member 20 is zero. The A operating state is a state in which the optical member 20 has been oscillated by a certain angle about the first oscillation axis AX by the first actuators 25 to shift the image position P0 by ¼ pixel in the second oscillation axis BX direction, and the optical member 20 has been oscillated by a certain angle about the second oscillation axis BX by the second actuators 26 to shift the image position P0 by ¼ pixel in the first oscillation axis AX direction. That is to say, the A operating state is a state in which an image is displayed at an image position P1, in which the image position P0 has been shifted to ABXa, which is one of an ABX direction, which is a composite of a vector toward one side in the first oscillation axis AX direction and a vector toward one side in the second oscillation axis BX direction.

Similarly, the B operating state is a state in which an image is displayed at an image position P2, in which the image position P0 has been shifted to ABXb, which is one of the ABX direction, which is a composite of a vector toward one side in the first oscillation axis AX direction and a vector toward one side in the second oscillation axis BX direction. Similarly, the C operating state is a state in which an image is displayed at an image position P3, in which the image position P0 has been shifted to ABXc, which is one of the ABX direction, which is a composite of a vector toward one side in the first oscillation axis AX direction and a vector toward one side in the second oscillation axis BX direction. Similarly, the D operating state is a state in which an image is displayed at an image position P4, in which the image position P0 has been shifted to ABXd, which is one of the ABX direction, which is a composite of a vector toward one side in the first oscillation axis AX direction and a vector toward one side in the second oscillation axis BX direction.

Figure 10:
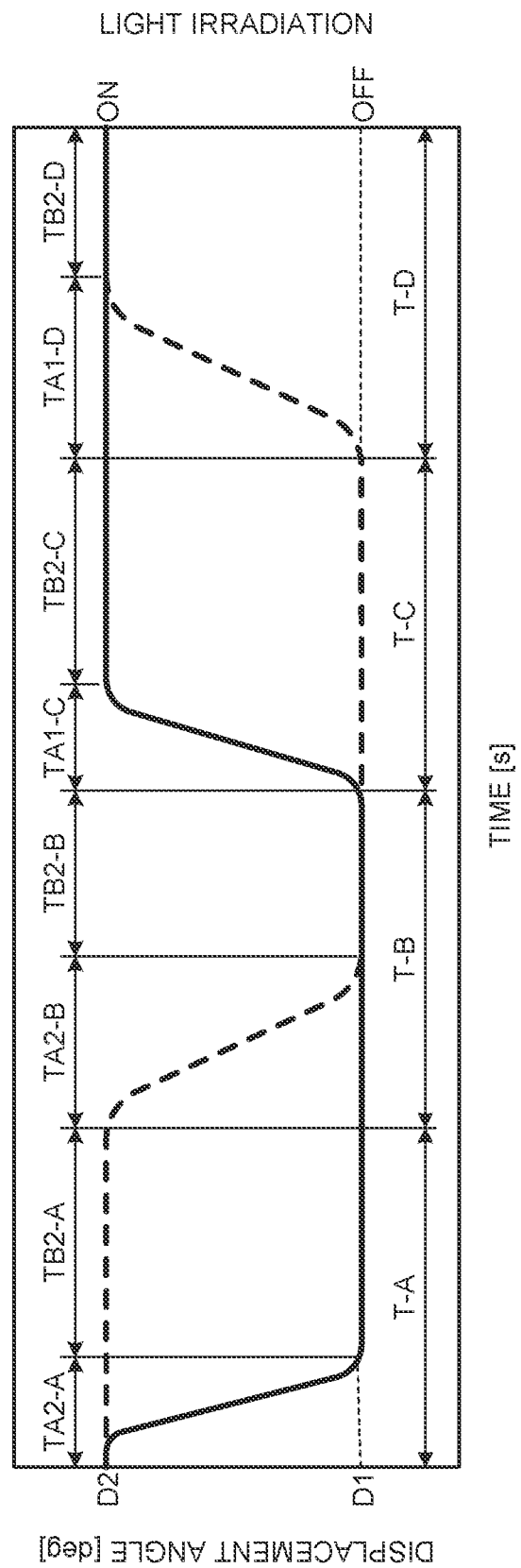
FIG. 10 is a graph illustrating a two-axis oscillation pattern when the natural frequencies of first shaft parts and second shaft parts are different from each other.
Figure 11:
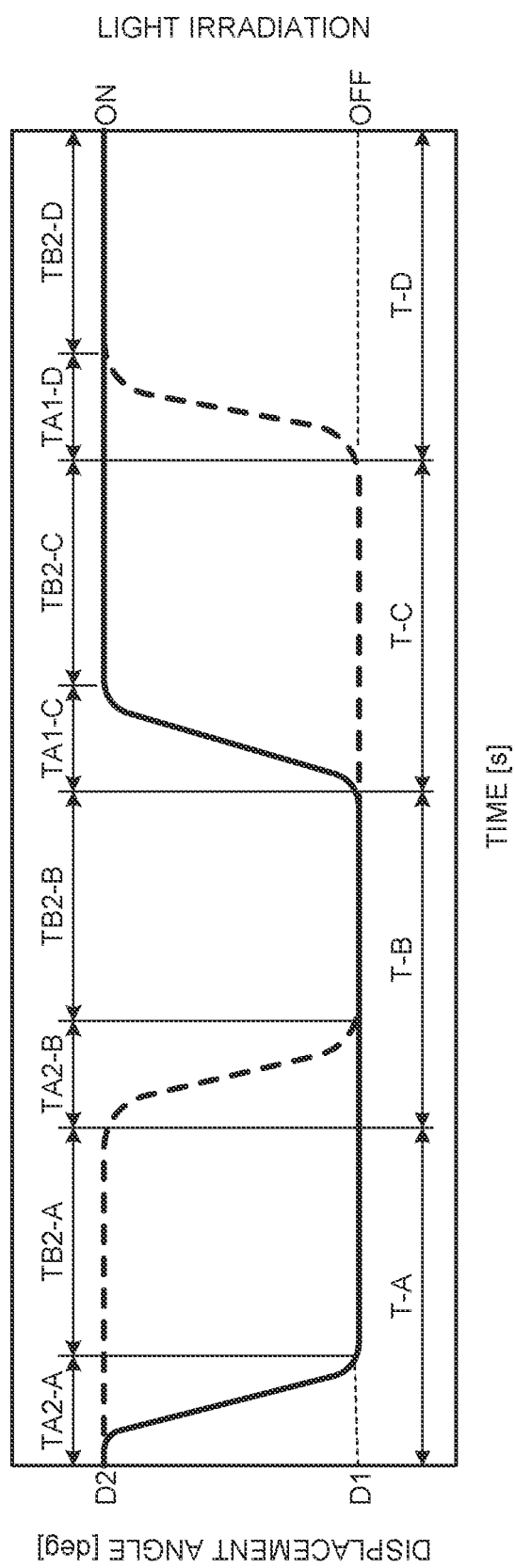
FIG. 11 is a graph illustrating a two-axis oscillation pattern when the natural frequencies of the first shaft parts and second shaft parts are the same.

The following describes oscillation patterns of the first oscillating part 21 and the second oscillating part 22 in the pixel operating state described above. FIG. 10 is a graph illustrating a two-axis oscillation pattern when the natural frequencies of the first shaft parts and the second shaft parts are different from each other, whereas FIG. 11 is a graph illustrating a two-axis oscillation pattern when the natural frequencies of the first shaft parts and the second shaft parts are the same.

In the following description, the oscillation pattern of the first oscillating part 21 refers to the displacement angle (an angle about the first oscillation axis AX) of the first oscillating part 21 with time when the drive signal is applied to the first actuators 25 and is illustrated by a solid line. The oscillation pattern of the second oscillating part 22 refers to the displacement angle (an angle about the second oscillation axis BX) of the second oscillating part 22 with time when the drive signal is applied to the second actuators 26 and is illustrated by a dotted line.

As illustrated in FIG. 10, in the displacement period TA2-A, the drive signal changes the current value from the second current value A2 to the first current value A1 (refer to FIG. 7). Thus, the first oscillating part 21 changes the displacement angle from the second angle D2 to the first angle D1 in the displacement period TA2-A. In the displacement period TA2-B, the drive signal changes the current value from the second current value A2 to the first current value A1. Thus, the second oscillating part 22 changes the displacement angle from the second angle D2 to the first angle D1 in the displacement period TA2-B.

In the displacement period TA1-C, the drive signal changes the current value from the first current value A1 to the second current value A2. Thus, the first oscillating part 21 changes the displacement angle from the first angle D1 to the second angle D2 in the displacement period TA1-C. In the displacement period TA1-D, the drive signal changes the current value from the first current value A1 to the second current value A2. Thus, the second oscillating part 22 changes the displacement angle from the first angle D1 to the second angle D2 in the displacement period TA1-D.

The displacement period TA2-A, the displacement period TA2-B, the displacement period TA1-C, and the displacement period TA1-D represent the periods of transition to the A operating state, the B operating state, the C operating state, and the D operating state described in FIG. 9, respectively. When the natural frequencies of the first shaft parts 23 and the second shaft parts 24 are different from each other, the lengths of the displacement period TA2-A and the displacement period TA2-B are different from each other, for example, and thus the lengths of a display period TB2-A and a display period TB2-B, in which the current is maintained, are different from each other, thus making the A operating state and the B operating state different from each other in image appearance, and degrading image quality. The same is true for the C operating state and the D operating state. On the other hand, as illustrated in FIG. 11, when the natural frequencies of the first shaft parts 23 and the second shaft parts 24 are the same, the lengths of the displacement period TA2-A and the displacement period TA2-B are the same, and thus the lengths of the display period TB2-A and the display period TB2-B, in which the current is maintained, are the same, thus making the A operating state and the B operating state the same in image appearance and suppressing degradation of image quality.

In the first embodiment, when the optical member 20 is oscillated in two axes, the torsional rigidity of the second shaft parts 24 as the center of the oscillation axis with a larger moment of inertia of the optical member 20 is set to be higher than the torsional rigidity of the first shaft parts 23 as the center of the oscillation axis with a smaller moment of inertia of the optical member 20. Then, the natural frequency of the first oscillating part 21 and the natural frequency of the second oscillating part 22 approximate each other (are the same), and the lengths of the displacement periods TA1-C and TA2-A of the first oscillating part 21 and the lengths of the displacement periods TA1-D and TA2-B of the second oscillating part 22 become the same, and image degradation can be suppressed.

As described above, in the optical path control mechanism 12 oscillating the optical member 20 in a secondary manner, the lengths of the displacement periods TA1-C and TA2-A of the first oscillating part 21 and the lengths of the displacement periods TA1-D and TA2-B of the second oscillating part 22 are made the same to suppress image degradation. In this case, the natural frequency of the first oscillating part 21 and the natural frequency of the second oscillating part 22 are the same. This displacement time is proportional to the natural frequency of each of the oscillating parts 21 and 22; as the natural frequency increases, the displacement time becomes shorter (the displacement speed increases), whereas as the natural frequency decreases, the displacement time becomes longer (the displacement speed decreases). When the natural frequency of the first oscillating part 21 and the natural frequency of the second oscillating part 22 correspond with an integer multiple (odd number) of the frame rate, the oscillating parts 21 and 22 cause unwanted vibration due to resonance, and the optical member 20 cannot be stopped stably.

Given these circumstances, in the optical path control apparatus 10 of the first embodiment, the natural frequency of the first oscillating part 21 and the natural frequency of the second oscillating part 22 are set to a value shifting from odd multiple values of the corresponding frame rate.

Specifically, the natural frequency of the first oscillating part 21 and the natural frequency of the second oscillating part 22 are set to a value within a range larger than an odd (n) multiple of the corresponding frame rate and smaller than an odd (n+2) multiple of the corresponding frame rate.

The optical path control mechanism 12 applies a drive signal with a trapezoidal waveform (a trapezoidal wave) to the first actuators 25 and the second actuators 26 by the drive circuit 16 to oscillate the first oscillating part 21 and the second oscillating part 22. This trapezoidal wave can be expressed as the sum of trigonometric functions by Fourier series expansion. This equation of trigonometric functions can be expressed by fundamental and odd-order harmonics as described below and can be an approximation of the trapezoidal wave illustrated in FIG. 7.

$$F(x)=(4/\pi)\times\{\sin(x)+(\tfrac{1}{4})\times\sin(3x)+(\tfrac{1}{10})\times\sin(5x)+(\tfrac{1}{25})\times\sin(7x)\}$$

Thus, when odd-order harmonic components and the natural frequency correspond with each other, the vibration of the first oscillating part 21 and the second oscillating part 22 becomes larger. This phenomenon has been demonstrated in a case of being actually operated and measured.

The displacement time of the first oscillating part 21 and the second oscillating part 22 is proportional to the natural frequency of the first oscillating part 21 and the second oscillating part 22. When the natural frequency of the first oscillating part 21 and the second oscillating part 22 corresponds with an odd multiple of the frame rate, the first oscillating part 21 and the second oscillating part 22 cause unwanted vibration due to resonance, and the optical member 20 cannot be stopped stably. Thus, in the first embodiment, the natural frequency of the first oscillating part 21 and the natural frequency of the second oscillating part 22 are set to be a frequency as large as possible and shifting from the frequency of an odd multiple of the frame rate.

That is to say, the natural frequency of the first oscillating part 21 and the second oscillating part 22 is set between the same frame rate×n (odd number) and the frame rate×(n+2), which is satisfied for all corresponding frame rates.

Frame rate×n (odd number)<natural frequency<frame rate×(n+2)

A plurality of frame rates are set in the display apparatus 1. Thus, it is preferable to set the natural frequency of the first oscillating part 21 and the natural frequency of the second oscillating part 22 shifting from odd multiple values of the corresponding frame rates.

For example, when three frame rates, or 60 Hz, 50 Hz, and 48 Hz, are corresponded, the natural frequency of the first oscillating part 21 and the second oscillating part 22 is set to a frequency satisfying the following three conditions.

180 Hz (60×3)<natural frequency<300 Hz (60×5)

250 Hz (50×5)<natural frequency<350 Hz (50×7)

240 Hz (48×5)<natural frequency<336 Hz (48×7)

That is to say, the natural frequency of the first oscillating part 21 and the second oscillating part 22 is in the following range.

250 Hz<natural frequency<300 Hz

Thus, in the optical path control apparatus 10 of the first embodiment, the natural frequency of the first oscillating part 21 and the natural frequency of the second oscillating part 22 are set to a value shifting from the odd multiple values of the corresponding frame rates. Thus, the unwanted vibration of the first oscillating part 21 and the second oscillating part 22 due to resonance can be suppressed, and the optical member 20 can be stopped stably.

Second Embodiment

Figure 12:
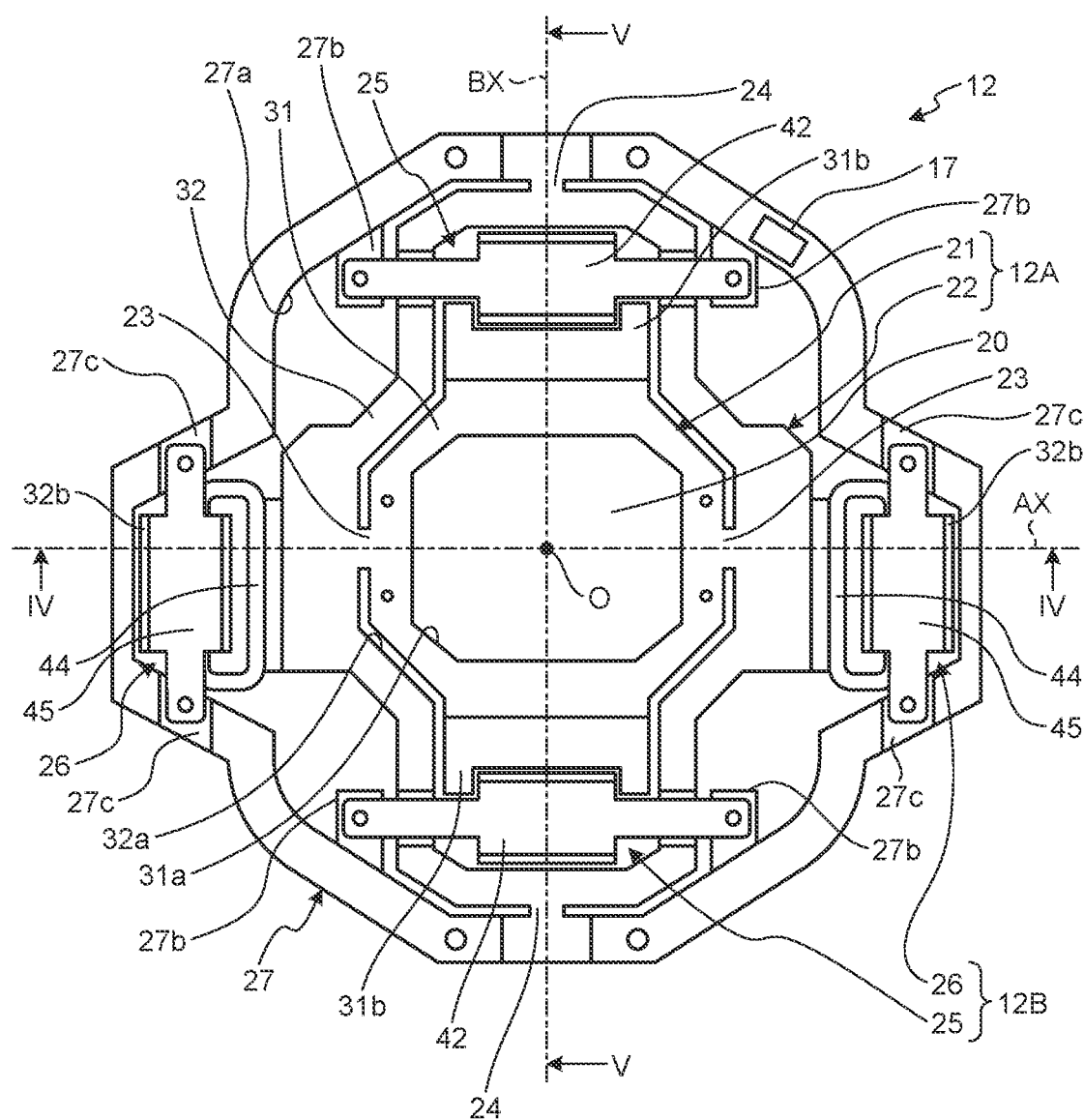
FIG. 12 is a sectional view of the optical path control mechanism according to a second embodiment.
Figure 13:
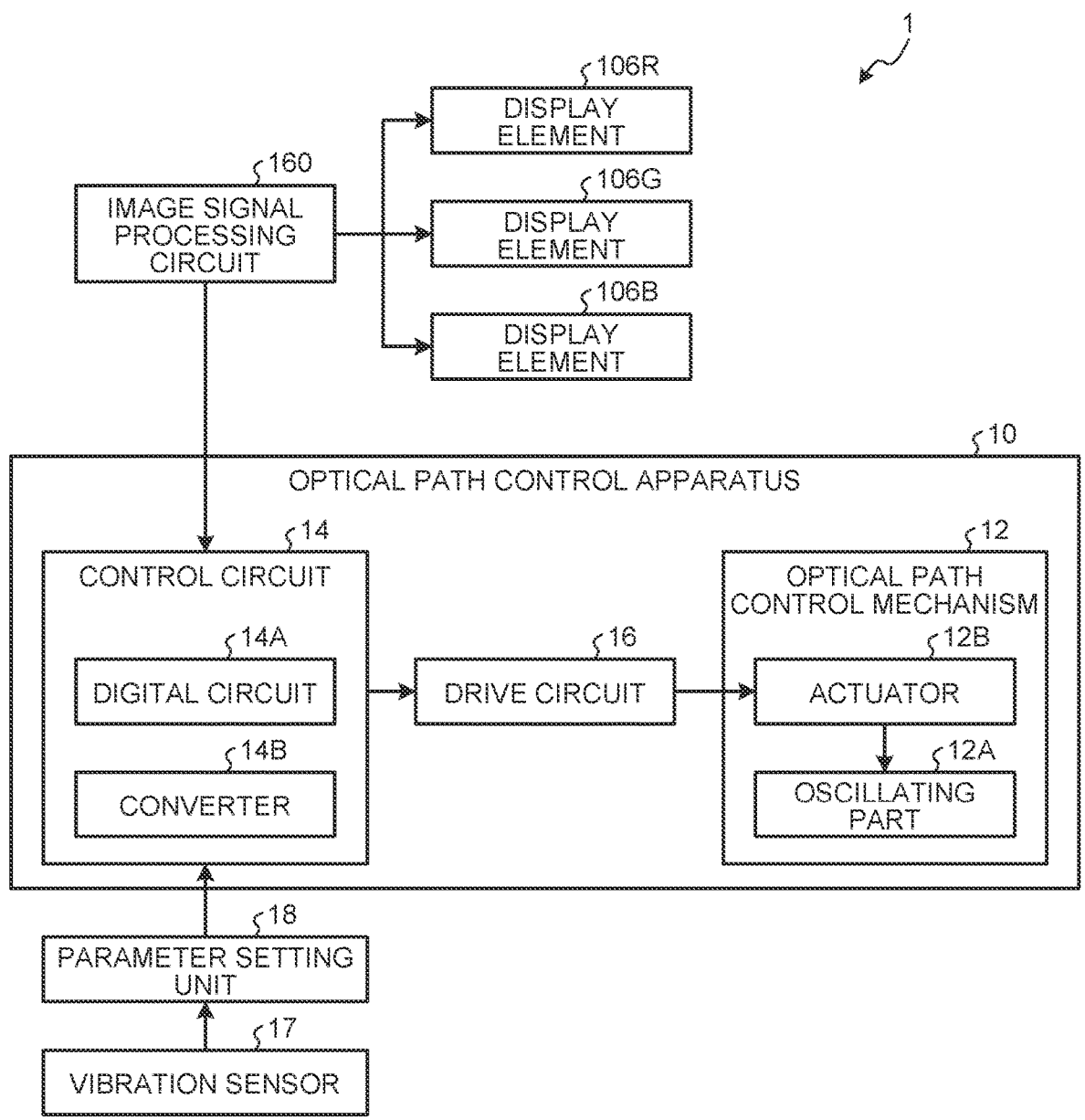
FIG. 13 is a block diagram schematically illustrating the circuit configuration of the display apparatus.

FIG. 12 is a sectional view of the optical path control mechanism according to a second embodiment, and FIG. 13 is a block diagram schematically illustrating a circuit configuration of the display apparatus. Members having the same functions as those of the first embodiment described above are denoted by the same symbols, and detailed descriptions thereof are omitted.

In the second embodiment, as illustrated in FIG. 13, the optical path control apparatus 10 has the optical path control mechanism 12, the control circuit 14, and the drive circuit 16.

The optical path control mechanism 12 has the oscillating part 12A including the optical member 20 and the actuators 12B oscillating the oscillating part 12A. The oscillating part 12A has the first oscillating part 21 and the second oscillating part 22. The first oscillating part 21 oscillates by the first shaft parts 23 along the first oscillation axis AX with respect to the second oscillating part 22. The second oscillating part 22 oscillates by the second shaft parts 24 along the second oscillation axis BX with respect to the support part 27. The actuators 12B have the first actuators 25 and the second actuators 26. The first actuators 25 oscillate the first oscillating part 21, whereas the second actuators 26 oscillates the second oscillating part 22.

The optical path control mechanism 12 oscillates the first oscillating part 21 and the second oscillating part 22 by the first actuators 25 and the second actuators 26 being driven by the drive circuit 16. The drive circuit 16 applies a drive signal with a trapezoidal wave to the first actuators 25 and the second actuators 26 to oscillate the first oscillating part 21 and the second oscillating part 22.

The natural frequency of the first oscillating part 21 and the second oscillating part 22 is set to a certain value as described in the first embodiment. The optical path control apparatus 10 sets the length of each displacement period based on the natural frequency of the first oscillating part 21 and the second oscillating part 22 and sets the trapezoidal wave of the drive signal in such a manner that the current value changes in the displacement period of the set length.

Incidentally, the parameters of the drive circuit 16, including the trapezoidal wave of the drive signal, are adjusted in advance before being mounted on products. However, the natural frequency of a vibrating part may change due to, for example, variations and changes over time in the mounting of the optical path control mechanism 12, the optical path control apparatus 10, or the like on the display apparatus 1, environmental changes, or the like. In this case, it is difficult to readjust the trapezoidal wave of the drive signal.

Given these circumstances, in the second embodiment, a vibration sensor is mounted on the optical path control apparatus 10, and the trapezoidal wave of the drive signal is adjusted and set based on the frequency of the first oscillating part 21 and the second oscillating part 22 detected by the vibration sensor. The waveform of the drive signal is not limited to the trapezoidal shape but may be a staircase shape, a rectangular shape, or the like.

That is to say, the optical path control apparatus 10 has a vibration sensor 17 and a parameter setting unit 18 in addition to the optical path control mechanism 12, the control circuit 14, and the drive circuit 16.

The vibration sensor 17 is mounted on the support part 27. The vibration sensor 17 can detect the frequency of the first oscillating part 21 and the second oscillating part 22 as the oscillating part 12A. The parameter setting unit 18 adjusts and sets the trapezoidal wave of the drive signal applied to the first actuators 25 and the second actuators 26 by the drive circuit 16 based on the frequency of the first oscillating part 21 and the second oscillating part 22 detected by the vibration sensor 17.

That is to say, a sine wave is applied (swept) to the first actuators 25 by the drive circuit 16 while gradually increasing its frequency from 0 Hz. In this process, the vibration sensor 17 placed in the support part 27 measures the vibration of the first oscillating part 21. The parameter setting unit 18 sets a frequency at which the first oscillating part 21 vibrates most significantly (resonates) as the natural frequency of the first oscillating part 21 based on the vibration of the first oscillating part 21 detected by the vibration sensor 17.

Similarly, a sine wave is applied (swept) to the second actuator 26 by the drive circuit 16 while gradually increasing its frequency from 0 Hz. In this process, the vibration sensor 17 placed in the support part 27 measures the vibration of the second oscillating part 22. The parameter setting unit 18 sets a frequency at which the second oscillating part 22 vibrates most significantly (resonates) as the natural frequency of the second oscillating part 22 based on the vibration of the second oscillating part 22 detected by the vibration sensor 17.

The control circuit 14 sets the trapezoidal wave of the drive signal, that is, the length of the displacement period based on the natural frequency of the oscillating parts 21 and 22 set by the parameter setting unit 18. The control circuit 14 then sets the trapezoidal wave of the drive signal in such a manner that the current value changes in the displacement period of the set length.

Thus, in the optical path control apparatus 10 of the second embodiment, the vibration sensor 17 is mounted on the optical path control apparatus 10, the vibration sensor 17 detects the natural frequency of the first oscillating part 21 and the second oscillating part 22, and the parameter setting unit 18 adjusts and sets the waveform of the drive signal based on the frequency of the first oscillating part 21 and the second oscillating part 22 detected by the vibration sensor 17. Thus, even if the natural frequency of the vibrating part changes due to variations and changes over time in the mounting of the optical path control mechanism 12, the optical path control apparatus 10, or the like on the display apparatus 1, environmental changes, or the like, the drive waveform (the trapezoidal wave) for oscillating the first oscillating part 21 and the second oscillating part 22 can be easily adjusted when the display apparatus 1 is shipped. Even if the natural frequency deviates due to age-related deterioration of the components after shipment of the display apparatus 1, the drive waveform (the trapezoidal waves) of the first oscillating part 21 and the second oscillating part 22 can be adjusted when necessary.

Effects

As described above, the optical path control apparatus according to the present embodiment includes the oscillating part 12A having the optical member (the optical part) 20 on which light is made incident, the first oscillating part 21 supporting the optical member 20, and the second oscillating part 22 supporting the first oscillating part 21 in an oscillatable manner by the first shaft parts 23 and supported on the support part 27 in an oscillatable manner by the second shaft parts 24, the first actuators 25 oscillating the oscillating part 12A about the first oscillation axis AX including the first shaft parts 23 with the first shaft parts 23 as supports, and the second actuators 26 oscillating the oscillating part 12A about the second oscillation axis BX including the second shaft parts 24 with the second shaft parts 24 as supports, in which the first oscillation axis AX crosses the second oscillation axis BX, and the torsional rigidity of the second shaft parts 24 is higher than the torsional rigidity of the first shaft parts 23.

According to the optical path control apparatus of the present embodiment, the torsional rigidity of the second shaft parts 24, which are on the outer side, is set to be higher than the torsional rigidity of the first shaft parts 23, which are on the inner side, whereby the natural frequencies of the optical member 20 oscillating with the first shaft parts 23 as supports and the optical member 20 oscillating with the second shaft parts 24 as supports can be made close to each other. Thus, the image output during the oscillation of the optical member 20 by the first shaft parts 23 and the image output during the oscillation of the optical member 20 by the second shaft parts 24 can be made uniform in appearance to suppress degradation of image quality.

The optical path control apparatus according to the present embodiment sets the torsional rigidity of the first shaft parts 23 and the torsional rigidity of the second shaft parts 24 in such a manner that the natural frequency of the first oscillating part 21 and the natural frequency of the second oscillating part 22 fall within the preset certain range. Thus, by setting the displacement times of the first oscillating part 21 and the second oscillating part 22 to the same length, degradation of image quality can be suppressed.

In the optical path control apparatus according to the present embodiment, the first shaft parts 23 and the second shaft parts 24 are made different from each other in at least one of the cross-sectional area, the length, and the material to make the torsional rigidity of the second shaft parts 24 higher than the torsional rigidity of the first shaft parts 23. Thus, the natural frequency of the first oscillating part 21 and the natural frequency of the second oscillating part 22 can be easily made close to each other.

In the optical path control apparatus according to the present embodiment, the light is light for an image, and the natural frequency of the first oscillating part 21 and the natural frequency of the second oscillating part 22 are set shifting from the odd multiple values of the corresponding frame rate. Thus, the natural frequency of the first oscillating part 21 and the natural frequency of the second oscillating part 22 are set shifting from the odd multiple values of the frame rate, whereby the resonance (unwanted vibration) of the first oscillating part 21 and the second oscillating part 22 can be suppressed, and the optical member 20 can be stopped stably. Thus, the image output during the oscillation of the optical member 20 by the first shaft parts 23 and the image output during the oscillation of the optical member 20 by the second shaft parts 24 can be made uniform in appearance to suppress degradation of image quality.

The optical path control apparatus according to the present embodiment sets the natural frequency of the first oscillating part 21 and the natural frequency of the second oscillating part 22 to the value within a range larger than the odd (n) multiple of the corresponding frame rate and smaller than the odd (n+2) multiple of the corresponding frame rate. Thus, the resonance (unwanted vibration) of the first oscillating part 21 and the second oscillating part 22 can be properly suppressed.

The optical path control apparatus according to the present embodiment includes the oscillating part 12A having the optical member (the optical part) 20 on which light is made incident, the actuators 12B oscillating the oscillating part 12A, the drive circuit 16 applying the drive signal with a waveform including the first period, in which the current value is changed and the second period, in which the current value is held, to the actuators 12B to oscillate the oscillating part 12A and to control the optical path of light passing through the optical member 20, the vibration sensor 17 detecting the frequency of the oscillating part 12A, and the parameter setting unit 18 setting the drive signal with the waveform based on the frequency of the oscillating part 12A detected by the vibration sensor 17.

According to the optical path control apparatus of the present embodiment, the vibration sensor 17 detects the frequency of the oscillating part 12A, and the parameter setting unit 18 sets the drive signal with the waveform based on the frequency of the oscillating part 12A, whereby the deviation of the waveform of the drive signal corresponding to the mounting positions of the components such as the optical member 20, the oscillating parts, and the actuators 12B can be adjusted at any time. Thus, the waveform of the drive signal for driving the actuators 12B can be automatically adjusted to reduce the number of man-hours.

The display apparatus according to the present embodiment includes the optical path control apparatus 10 and the irradiation apparatus 100 irradiating the oscillating part 12A with the light L. The display apparatus 1 includes the optical path control apparatus 10 and can thereby stably oscillate the oscillating part 12A and suppress image degradation.

Although in the embodiments described above, the optical member 20 is supported in an oscillatable manner by the first shaft parts 23 along the first oscillation axis AX and is supported in an oscillatable manner by the second shaft parts 24 along the second oscillation axis BX, this is not limiting.

The optical path control apparatus 10 according to the present invention has been described; it may be implemented in various different forms other than the embodiments described above.

The illustrated components of the optical path control apparatus 10 are functionally conceptual and do not necessarily have to be physically configured as illustrated. That is to say, the specific form of each apparatus is not limited to illustrated one but may be functionally or physically distributed or integrated in arbitrary units in whole or in part in accordance with the processing burden and the usage of each apparatus.

The configuration of the optical path control apparatus 10 is implemented, for example, as software by a computer program or the like loaded onto a memory. In the above embodiments, the configuration has been described as functional blocks implemented by the cooperation of these pieces of hardware or software. That is to say, these functional blocks can be implemented in various forms by hardware alone, software alone, or a combination of them.

The present invention can make the image output during the oscillation of the optical part by the first shaft parts and the image output during the oscillation of the optical part by the second shaft parts uniform in appearance to suppress degradation of image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical path control apparatus comprising:
    an oscillating part, the oscillating part having an optical part on which light is made incident, a first oscillating part for supporting the optical part, and a second oscillating part for supporting the first oscillating part in an oscillatable manner by a first shaft part, the second oscillating part being supported on a support part in an oscillatable manner by a second shaft part;
    a first actuator configured to oscillate the oscillating part about a first oscillation axis including the first shaft part with the first shaft part as a support; and
    a second actuator configured to oscillate the oscillating part about a second oscillation axis including the second shaft part with the second shaft part as a support, wherein
    the first oscillation axis crosses the second oscillation axis,
    torsional rigidity of the second shaft part is higher than torsional rigidity of the first shaft part,
    the light is light for an image, and
    a natural frequency of the first oscillating part and a natural frequency of the second oscillating part are set shifting from odd multiple values of a corresponding frame rate of the image.

2. The optical path control apparatus according to claim 1, wherein the torsional rigidity of the first shaft part and the torsional rigidity of the second shaft part are set such that a natural frequency of the first oscillating part and a natural frequency of the second oscillating part fall within a preset certain range.

3. The optical path control apparatus according to claim 1, wherein the first shaft part and the second shaft part are made different from each other in at least one of cross-sectional area, length, or material to make the torsional rigidity of the second shaft part higher than the torsional rigidity of the first shaft part.

4. The optical path control apparatus according to claim 1, wherein the natural frequency of the first oscillating part and the natural frequency of the second oscillating part are set to a value within a range larger than an odd (n) multiple of the corresponding frame rate of the image and smaller than an odd (n+2) multiple of the corresponding frame rate.

5. A display apparatus comprising:
    the optical path control apparatus according to claim 1; and
    an irradiation apparatus configured to irradiate the optical part with light.

* * * * *